United States Patent
Wang et al.

(10) Patent No.: US 8,111,266 B2
(45) Date of Patent: Feb. 7, 2012

(54) DISPLAY DEVICE AND METHOD FOR EDITING IMAGES

(75) Inventors: Chuan-Hong Wang, Taipei Hsien (TW); Hong-Yang Yeh, Taipei Hsien (TW); Xiao-Guang Li, Shenzhen (CN); Ming-Feng Tsai, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 563 days.

(21) Appl. No.: 12/409,531

(22) Filed: Mar. 24, 2009

(65) Prior Publication Data

US 2010/0079487 A1    Apr. 1, 2010

(30) Foreign Application Priority Data

Sep. 26, 2008    (CN) .......................... 2008 1 0304690

(51) Int. Cl.
*G09G 5/00*    (2006.01)
(52) U.S. Cl. ........................................ 345/620; 345/660
(58) Field of Classification Search .................. 345/620, 345/660
See application file for complete search history.

(56) References Cited

U.S. PATENT DOCUMENTS

| 7,489,324 | B2 * | 2/2009 | Royal et al. | 345/667 |
| 7,587,671 | B2 * | 9/2009 | Saft et al. | 715/253 |
| 2006/0139371 | A1 * | 6/2006 | Lavine et al. | 345/620 |
| 2008/0100642 | A1 * | 5/2008 | Betancourt et al. | 345/663 |

\* cited by examiner

*Primary Examiner* — Ryan R Yang
(74) *Attorney, Agent, or Firm* — Altis Law Group, Inc.

(57) ABSTRACT

A method for editing image is provided. The method includes steps of: reading a to-be-displayed image; determining whether the display ratio of the image is with the same as the aspect of the display unit; editing the image if the display ratio of the image is not with the same as the aspect ratio of the display unit, and displaying the cropped image on the display unit. A display device for editing images is also provided.

6 Claims, 7 Drawing Sheets

DISPLAY DEVICE AND METHOD FOR EDITING IMAGES

BACKGROUND

1. Technical Field

The present disclosure relates to a display device and a method for editing images.

2. Description of Related Art

In general, when a display ratio of an image is not consistent with an aspect ratio of the display screen, the display screen will not display the entire image according to the display ratio of the image. So, the user must adjust or edit images for better viewing.

In the related art, there are two manners for adjusting or editing a image. The first manner is for compressing the image until the display ratio of the image is consistent with the aspect ratio of the display screen, thereafter the display screen will display the full image, however, the compression results in a distorted image. The second manner is to crop the image. When the display ratio of the image is greater than the aspect ratio of the display screen, the display screen will zoom in/out on the image until the width of the image is equal to the display screen, and then crop the portion of the image beyond the top and bottom of the display area of the screen. When the display ratio of the image is less than the aspect ratio of the display screen, the display screen will zoom in/out on the image until the height of the image is equal to the display screen, and then crop the portion of the image beyond the sides of the display area of the screen. Although cropping will not result in image distortion, it is an indiscriminate method and may result in losing desired portions of the image such as persons at the edges of a group photo.

Therefore, what is needed is a display device and a method for discriminate cropping of images.

DETAILED DESCRIPTION OF THE EMBODIMENTS

Figure 1:
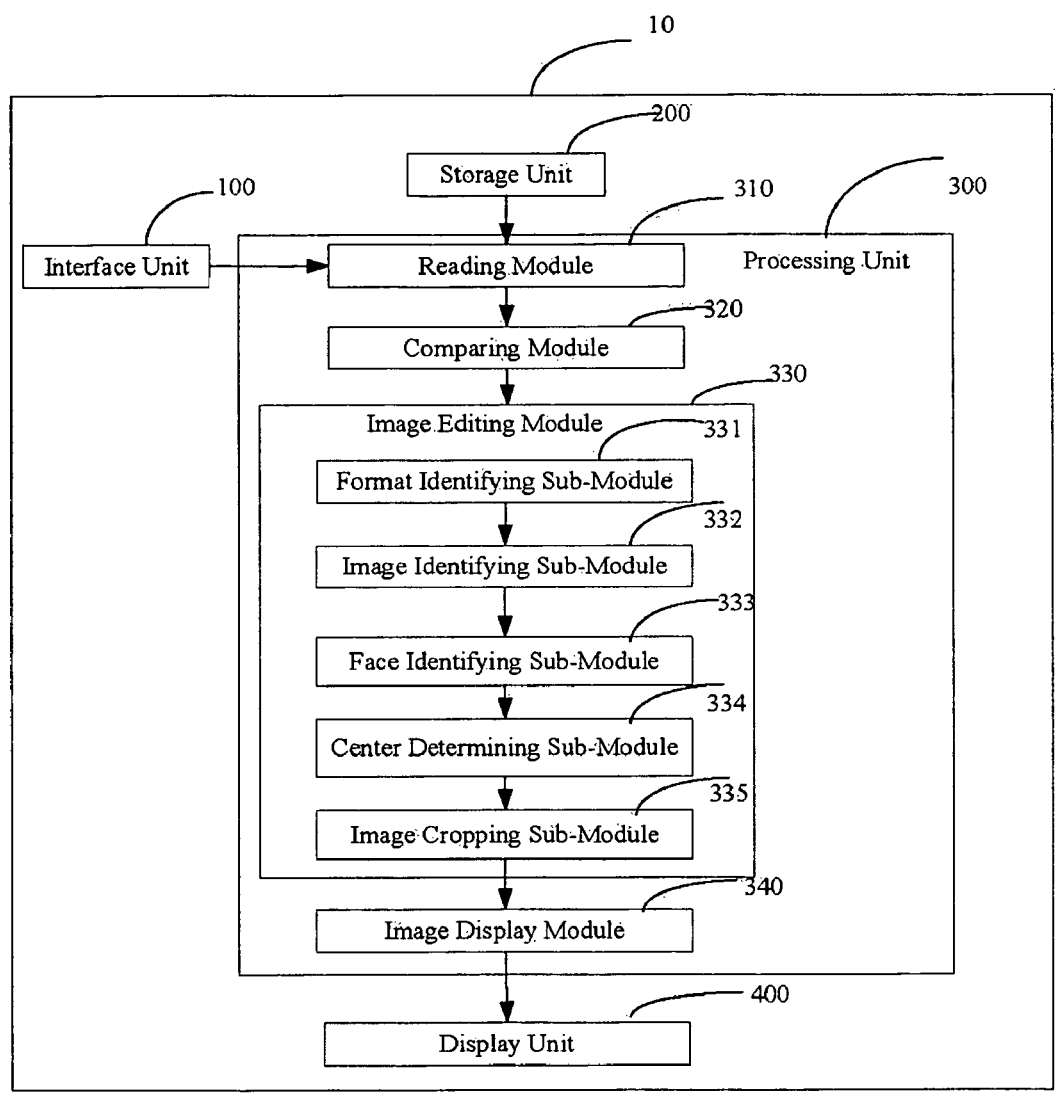
FIG. 1 is a block diagram of a hardware infrastructure of a display device in accordance with an exemplary embodiment.

FIG. 1 is a block diagram of a hardware infrastructure of the display device in accordance with an exemplary embodiment. The display device 10 includes an interface unit 100, a storage unit 200, a processing unit 300, and a display unit 400. The interface unit 100 is configured to communicate with an external storage device (not shown), for example, such as a digital camera, a flash memory, a mobile hard disk, and so on. The interface unit 100 can be a USB interface, a 1394 interface, and so on. The storage unit 200 is configured to store images of the display device 10. The images can be grouped into a plurality of groups according to content of the images, for example, such as portraits, group portraits, landscape images and so on. The display unit 400 is configured to display images.

The processing unit 300 includes a reading module 310, a comparing module 320, an image editing module 330, and an image display module 340. The reading module 310 is configured to read a to-be-displayed image from the storage unit 100 or an external device. The processing unit 300 processes the read image according to the subject of the read image. For example, if there are no faces of people in the image, the processing unit 300 processes the image in a usual manner without special editing for displaying. If there are people's faces in the image, the processing unit 300 automatically processes the image in a particular manner described below. The comparing module 320 is configured to acquire a display ratio of the read image and an aspect ratio of the display unit 400, and compare the display ratio with the aspect ratio to determine whether the display device 10 can display the entire read image. When the display ratio of the read image is with the same as the aspect ratio, the display device 10 displays the entire read image without editing; otherwise, the display device 10 displays the image after the image editing module 330 edits the image.

The image editing module 330 includes an image identifying sub-module 332, a face identifying sub-module 333, a center determining sub-module 334, and an image cropping sub-module 335. The image identifying sub-module 332 is configured to identify whether the content of the image includes person(s). Typically, the image identifying sub-module 332 defines the image as an individual portrait image if the image includes the face of one person, and defines the image as a group portrait if there is more than one face. The face identifying sub-module 333 is configured to identify locations and number of the human face(s) in the image if the image is the portrait image. For example, in the exemplary embodiment, the face identifying sub-module 333 employs an Adaboost arithmetic to identify the location and the number of the human face(s) in the image. However, it should be noted that, in other exemplary embodiments, the face identifying sub-module 333 can also use some other method to identify the location and the number of human face(s) in the image. In this embodiment, faces and facial identification is used merely as an example. In other embodiments, Identification technology may be used to detect any one or more of other subjects of interest such as animals, cars, etc. The point of the present disclosure being to present a system and method that can be used to protect areas of images important to users from cropping when processed for display.

The center determining sub-module 334 is configured to determine a point to be taken as the center of the image for editing purposes so that cropping of the image will take place at portions of the image furthest from the subject of interest in an image, hereafter the point will be called the central point. In this way, important areas of an image can be protected from cropping. In this embodiment, when the image is the individual portrait image, the center determining sub-module 334 determines the center of the face according to facial contours. When the image is the group portrait and includes two faces, the center determining sub-module 334 determines the center of each face, then takes the middle point of a line connecting the two centers as the center point. When the image is the group portrait and includes more than two faces, the center determining sub-module 334 determines the center points of each face, then further determines which center points are at the perimeter of the group of center points, then connects each of peripherally located center points in turn to form a polygon that encompasses all center points, and then takes the center point of the polygon as the determined center point.

The image cropping sub-module 334 is configured to crop the image according to the determined center point of the image.

Figure 2:
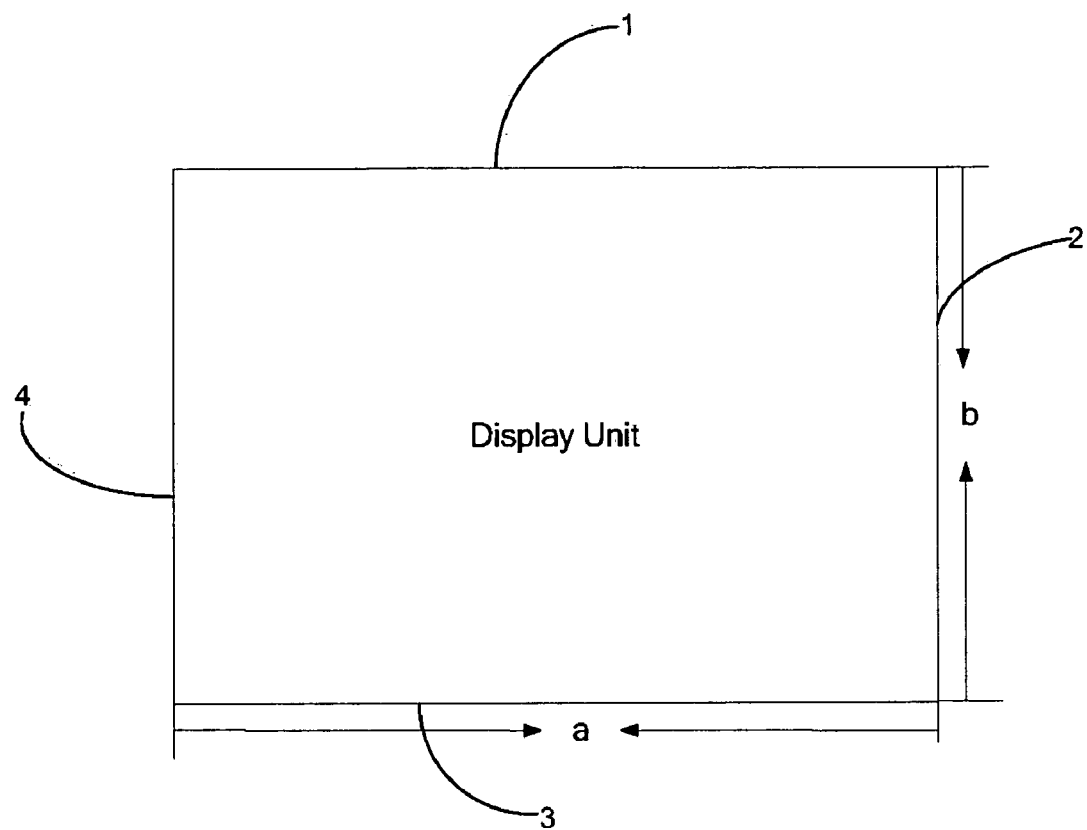
FIGS. 2-6 are schematic diagrams showing a process of image cropping by the display device 10 of FIG. 1 in accordance with an exemplary embodiment.

FIGS. 2-6 are schematic diagrams showing a process of image cropping by the display device 10 of FIG. 1 in accordance with an exemplary embodiment. As shown in FIG. 2, four sides of the display unit 400 are marked with "side 1", "side 2", "side 3", and "side 4" respectively, wherein the length of the "side 1" and "side 3" is a, and the length of the "side 2" and "side 4" is b.

Figure 3:
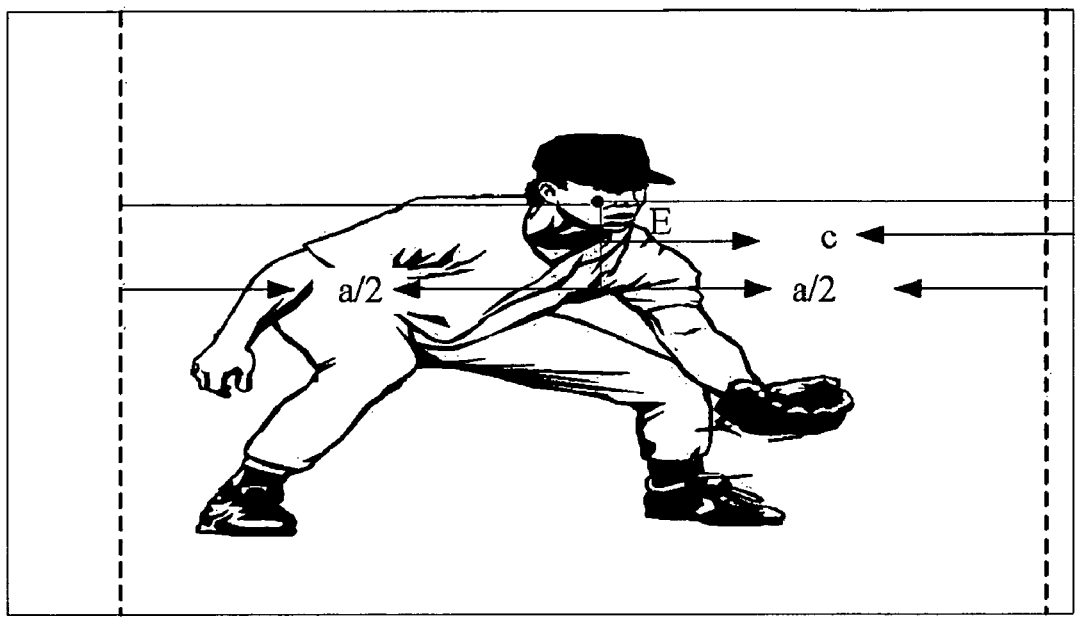
Figure 4:
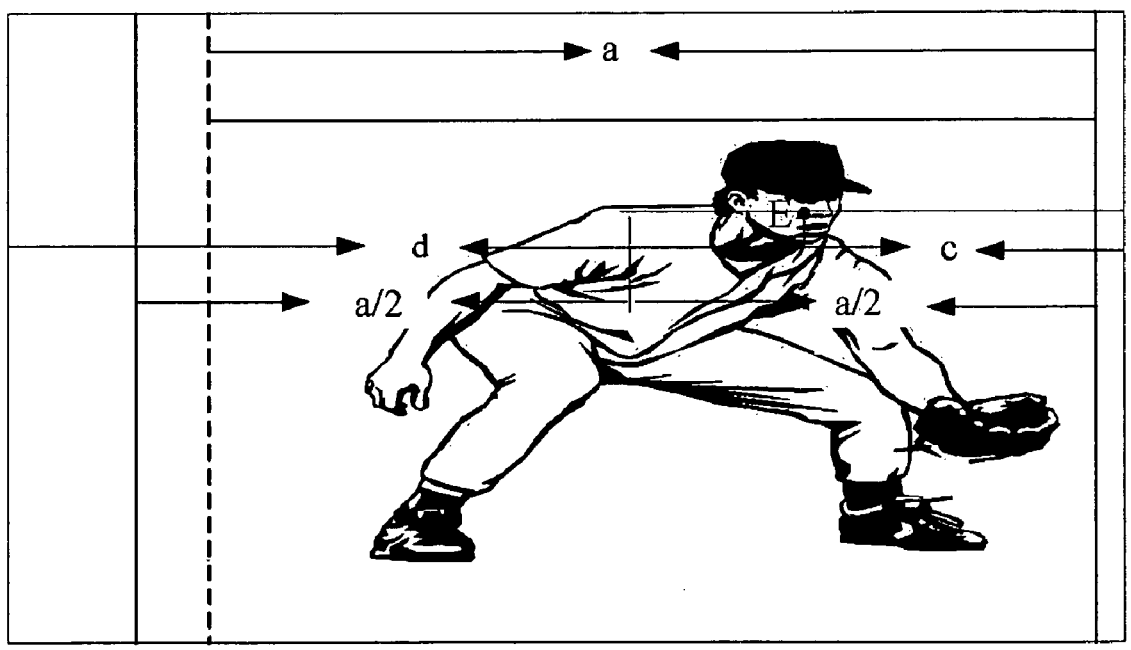

As shown in FIGS. 3 and 4, the aspect ratio of the display device 10 is a ratio of a wide side to a high side of the display unit 400, namely a ratio of a to b. When the display ratio of the image is greater than the aspect ratio of the display unit 400 and the image is the individual portrait image, the image cropping sub-module 334 crops the image according to following steps. First, the image cropping sub-module 334 zooms in/out on the image until the height of the image is equal to the height of the display unit 400. Second, the image cropping sub-module 334 marks the center of the face with point E, and defines the distance from the point E to the side 2 is c, and the distance from the point E to the side 4 is d. Third, the image cropping sub-module 334 compares the shorter of distances c and d with a/2. If the shorter of distances c and d is greater than a/2, as shown in FIG. 3, the image cropping sub-module 334 determines two broken lines and crops a portion of the image which is beyond the two determined broken lines. Wherein the two determined broken lines are parallel to the high side of the display unit 400, and the distance between any one of the broken lines and the point E is a/2. If the shorter of distances c and d is less than a/2, as shown in FIG. 4, the image cropping sub-module 334 determines a broken line and crops a portion of the image which is beyond the determined broken line. Wherein the determined broken line is parallel to the high side of the display unit 400, and the distance between the determined broken line and the side is a, wherein the side is a nearest side to point E.

Figure 5:
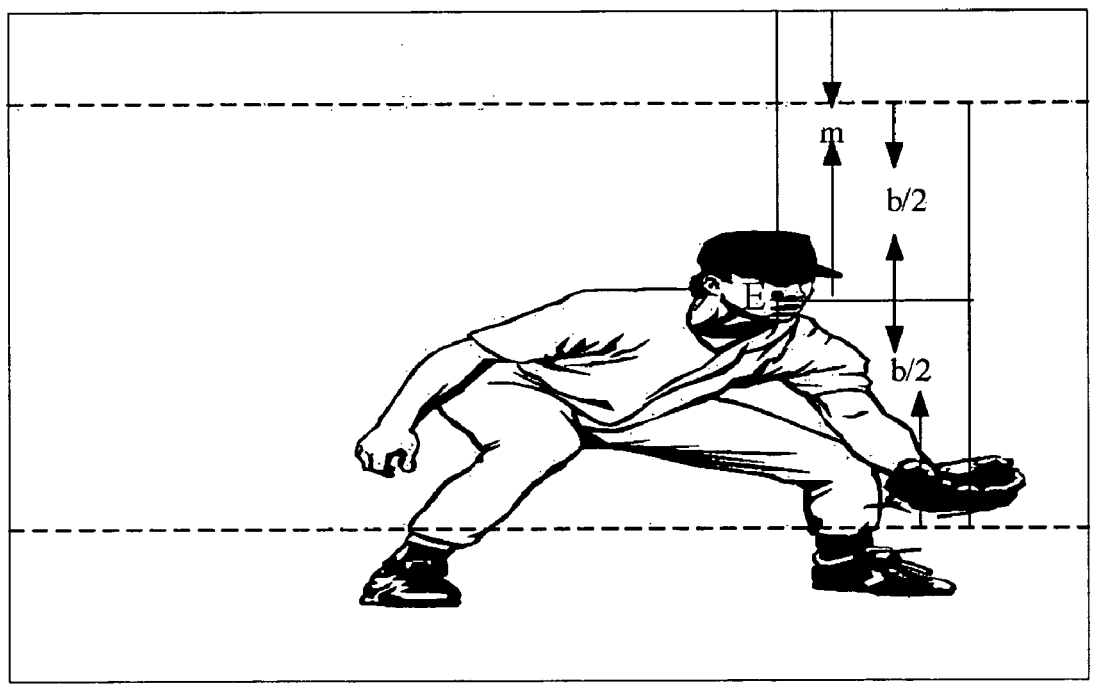
Figure 6:
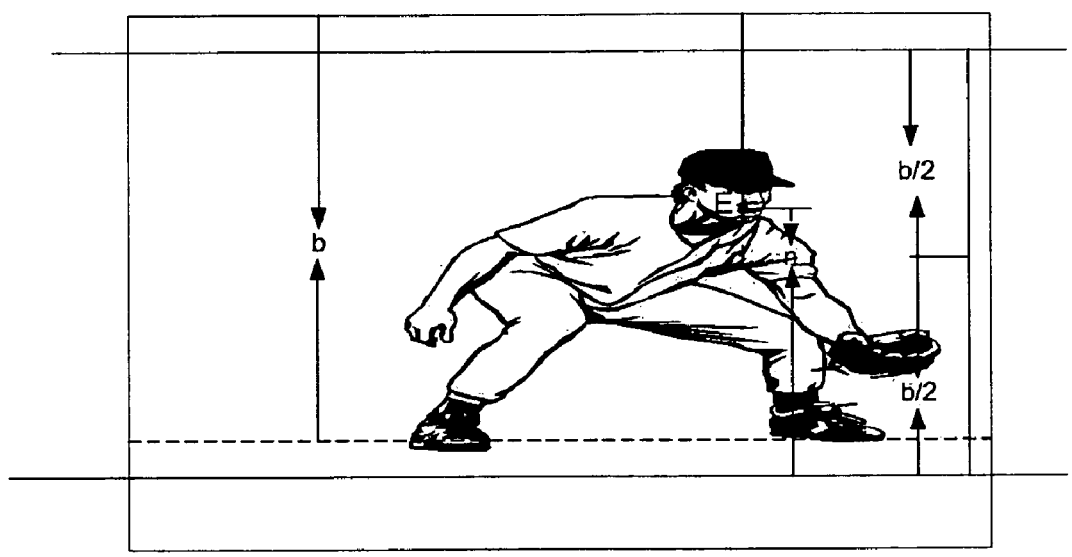

As shown in FIGS. 5 and 6, when the display ratio of the image is less than the aspect ratio of the display unit 400 and the image is the individual portrait image, the image cropping sub-module 334 crops the image according to steps as follows. First, the image cropping sub-module 334 zooms in/out on the image until the width of the image is equal to the width of the display unit 400. Second, the image cropping sub-module 334 marks the center of the face with point E, and defines the distance from the point E to the side 1 is m, the distance from the point E to the side 3 is n. Finally, the image cropping sub-module 334 compares the shorter of the distances m and n with b/2. If the shorter of the distances m and n is greater than b/2, as shown in FIG. 5, the image cropping sub-module 334 determines two broken lines, and crops a portion of the image which is beyond the two determined broken lines. Wherein the two determined broken lines are parallel to the wide side of the display unit, and the distance between any one of the broken lines and the point E is b/2. If the shorter of distances m and n is less than b/2, as shown in FIG. 6, the image cropping sub-module 334 determines a broken line, and crops a portion of the image which is beyond the determined broken line. Wherein the determined broken line is parallel to the wide side of the display unit 400, and the distance between the determined broken line and the side is b, wherein the side is a nearest side to point E.

In another exemplary embodiment as shown in FIG. 1, the image editing module 330 further includes a format identifying sub-module 331. The format identifying sub-module 331 is configured to identify a display format of the image. In general, a read image can be an oblong image whose width is greater than height thereof, or can be a vertical image whose width is less than the height thereof. When the format identifying sub-module 331 identifies the read image is the vertical image, the center determining sub-module 334 moves down the identified center of the face for a predetermined distance, thereafter the image cropping sub-module 334 crops the vertical image according to the above steps of FIGS. 2-6.

The image display module 340 is configured to display the edited image on the display unit 400 after the image cropping sub-module 335 has cropped the image.

Figure 7:
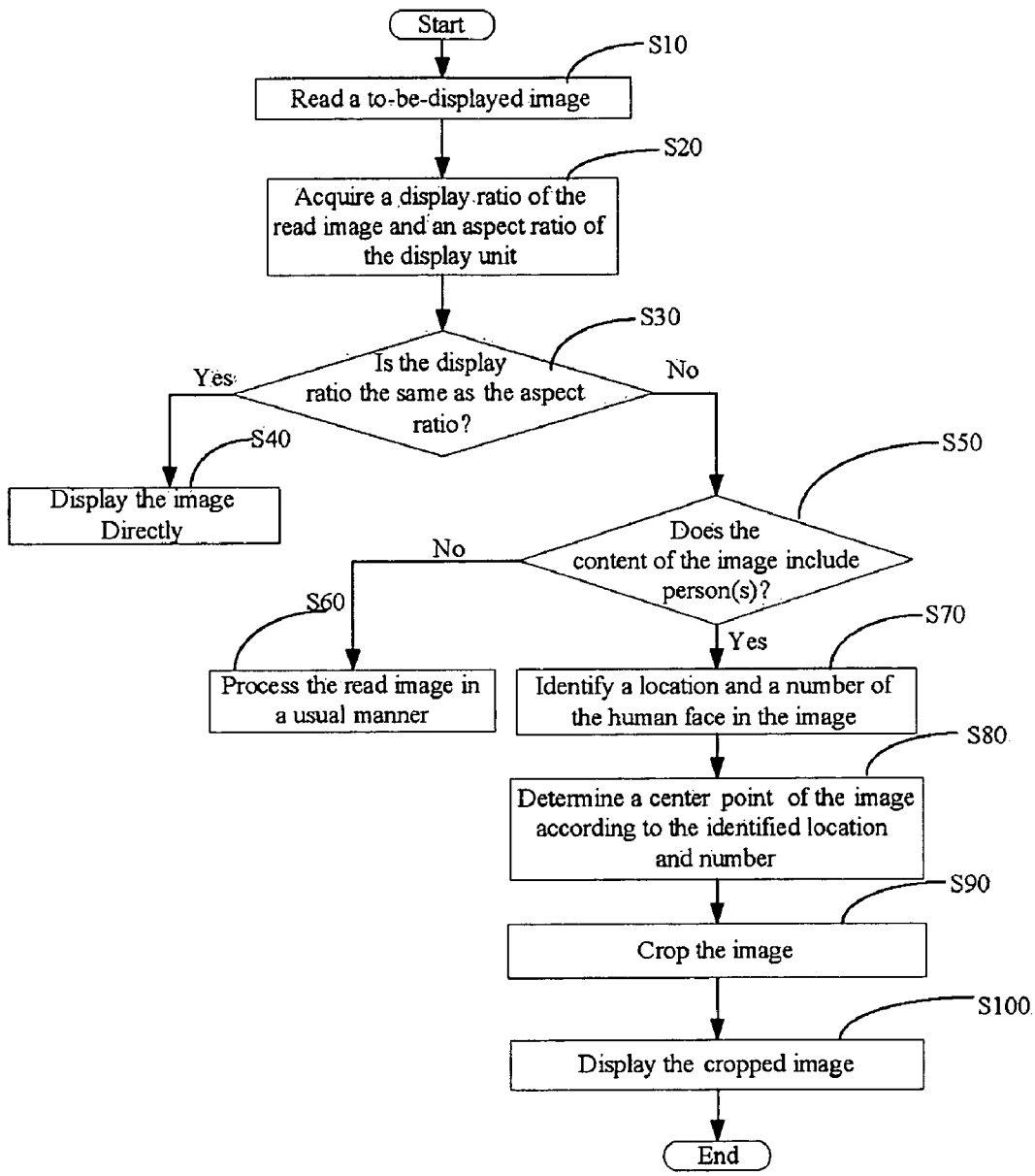
FIG. 7 is a flowchart of an image editing method implemented by the display device of FIG. 1 in accordance with an exemplary embodiment.

FIG. 7 is a flowchart of an image adjustment method implemented by the display device of FIG. 1 in accordance with an exemplary embodiment.

In step S10, the reading module 310 reads a to-be-displayed image from the storage unit 100 or the external storage device.

In step S20, the comparing module 320 acquires the display ratio of the image and the aspect ratio of the display unit 400.

In step S30, the comparing module 320 determines whether the display ratio of the image is the same as the aspect ratio of the display unit 400.

If the display ratio of the image is the same as the aspect ratio of the display unit 400, in step S40, the image display module 330 displays the entire image without editing.

If the display ratio of the image is not the same as the aspect ratio of the display unit 400, the image editing module 330 edits the image according to steps described below.

In step S50, the image identifying sub-module 332 identifies whether the content of the image includes person(s).

In step S60, if the content of the image does not include person, the display device 10 processes the image in the usual manner.

In step S70, the face identifying sub-module 333 identifies the location and the number of the human face(s) in the image if the image is the individual portrait or the group portraits.

In step S80, the center determining sub-module 334 determines a center point of the image according to the identified location and the number of the human face(s) in the image.

In step S90, the image cropping sub-module 335 crops the image according to the determined center point of the image.

In step S100, the image display module 340 displays the image on the display unit 400 after the image cropping sub-module 335 has cropped the image.

In another exemplary embodiment, the method further includes following steps. When the format identifying sub-module 331 identifies that the image is the vertical image, the center determining sub-module 334 shifts the determined center point down a predetermined distance, and the image cropping sub-module 335 crops the vertical image according to steps of FIGS. 2-6.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A display device capable for editing images, comprising:
a display unit; and
a processing unit comprising:
  a reading module capable of reading a to-be-displayed image;
  a comparing module capable of acquiring a display ratio of the image and an aspect ratio of the display unit, and determining whether the display ratio is the same as with the aspect ratio;
  an image editing module capable of editing the image if the display ratio of the image is not the same as the aspect ratio of the display unit, the image editing module comprising:

an image identifying sub-module capable of identifying whether the content of the image comprises person(s);

a face identifying sub-module capable of identifying locations and number of the human face(s) in the image if the image is an individual portrait image which includes one face or a group portraits which includes more than one faces;

a center determining sub-module capable of determining a center point of the image according to the identified location and the identified number of the human face(s) in the image; and an image cropping sub-module capable of cropping the image according to the determined center point of the image; and an image display module capable of displaying the cropped image on the display unit, Wherein when the display ratio of the image is greater than the aspect ratio of the display unit and the image is a individual portrait image, the image cropping sub-module zooms in/out on the image until a height of the image is equal to a height of the display unit, determines one or two broken lines which is parallel to the high side of the display unit, and crops a portion of the image beyond the determined broken lines; and wherein when the display ratio of the image is less than the aspect ratio of the display unit and the image is the individual portrait image, the image cropping sub-module zooms in/out on the image until a width of the image is equal to a width of the display unit, determines one or two broken lines which is parallel to the wide side of the display unit, and crops a portion of the image beyond the determined broken lines.

2. The display device as claim 1, the image editing module further comprises:

a format identifying sub-module capable of identifying a display format of the image according to the aspect ratio of the image, wherein if the image is a vertical image whose width is less than height, the image cropping sub-module shifts the center point down a predetermined distance before the image cropping sub-module crops the vertical image.

3. The display device as claim 1, wherein when the image is a individual portrait image, the center determining sub-module is configured to determine the center point of the image according to facial contours;

when the image is the group portrait and includes two faces, the center determining sub-module is configured to determine the center of each face, then takes a middle point of a line connecting the two centers as the determined center point; and when the image is group portrait and includes more than two faces, the center determining sub-module is configured to determine the center points of each face, then is further configured to determine which center points are at the perimeter of the group of center points, then connects each of peripherally located center points in turn to form a polygon that encompasses all center points, and takes the center point of the polygon as the determined center point.

4. A method for editing an image, comprising:

reading a to-be-displayed image;

acquiring a display ratio of the image and an aspect ratio of a display unit, and comparing whether the display ratio is with the same as the aspect ratio;

editing the image if the display ratio is not the same as the aspect ratio, wherein the editing comprises:

identifying whether the content of the image includes person(s);

identifying locations and number of the human face(s) in the image if the image is an individual portrait image or a group portraits;

determining a center point of the image according to the identified location and the number of the human face(s) in the image;

when the display ratio of the image is greater than the aspect ratio of the display unit and the image is the individual portrait image, zooming in/out on the image until a height of the image is equal to a height of the display unit, determining one or two broken lines which is parallel to the high side of the display unit, and cropping a portion of the image beyond the determined broken lines;

when the display ratio of the image is less than the aspect ratio of the display unit and the image is the individual portrait image, zooming in/out on the image until a width of the image is equal to a width of the display unit, determining one or two broken lines which is parallel to the wide side of the display unit, and cropping a portion of the image beyond the determined broken lines; and displaying the cropped image.

5. The method as described in claim 4, further comprising:

determining a display format of the image;

shifting the center point down a predetermined distance and cropping the image if the image is a vertical image whose width is less than height.

6. The method as described in claim 4, wherein the determining the center location step further comprises:

when the image is the individual portrait image, determining the center point of the face according to facial contours;

when the image is the group portrait and includes two faces, determining the center of each face, then taking the middle point of a line connecting the two centers as the center point; and when the image is the group portraits and includes more than two faces, determining the center points of each face, then further determining which center points are at the perimeter of the group of center points, then connects each of peripherally located center points in turn to form a polygon that encompasses all center points, and then taking the center point of the polygon as the determined center point.

* * * * *